(12) United States Patent
Min et al.

(10) Patent No.: US 12,538,229 B2
(45) Date of Patent: Jan. 27, 2026

(54) APPARATUS, SYSTEM, AND METHOD OF MULTI-USER (MU) TRANSMISSION

(71) Applicant: INTEL CORPORATION, Santa Clara, CA (US)

(72) Inventors: Alexander W. Min, Portland, OR (US); Rath Vannithamby, Portland, OR (US); Arjun Anand, Santa Clara, CA (US); Vinod Kristem, San Jose, CA (US)

(73) Assignee: INTEL CORPORATION, Santa Clara, CA (US)

(*) Notice: Subject to any disclaimer, the term of this patent is extended or adjusted under 35 U.S.C. 154(b) by 1252 days.

(21) Appl. No.: 17/133,953

(22) Filed: Dec. 24, 2020

(65) Prior Publication Data
US 2021/0120497 A1    Apr. 22, 2021

(51) Int. Cl.
*H04W 52/02* (2009.01)
*H04L 5/00* (2006.01)
*H04W 28/18* (2009.01)

(52) U.S. Cl.
CPC ....... *H04W 52/0235* (2013.01); *H04L 5/0007* (2013.01); *H04W 28/18* (2013.01)

(58) Field of Classification Search
None
See application file for complete search history.

(56) References Cited

U.S. PATENT DOCUMENTS

| 2015/0103767 A1* | 4/2015 | Kim | H04W 74/06 370/329 |
| 2015/0271850 A1* | 9/2015 | Kim | H04W 74/08 370/329 |
| 2020/0153747 A1* | 5/2020 | Takada | H04L 47/6215 |

OTHER PUBLICATIONS

IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.
IEEE P802.11ax/D8.0 Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, Oct. 2020, 820 pages.

* cited by examiner

*Primary Examiner* — Willie J Daniel, Jr.
(74) *Attorney, Agent, or Firm* — Shichrur & Co.

(57) ABSTRACT

For example, an Access Point (AP) wireless communication station (STA) may be configured to identify a plurality of non-AP STAs in a Power Save (PS) poll-less (PS-Poll-less) Power Save Mode (PSM) to be addressed by a PS-Poll-less Multi-User (MU) Downlink (DL) transmission, which does not require prior receipt of PS Poll frames from the plurality of non-AP STAs in the PS-Poll-less PSM; to transmit a beacon frame including a traffic indication to indicate that traffic is pending for transmission from the AP STA to the plurality of non-AP STAs in the PS-Poll-less PSM; and, subsequent to the beacon frame, transmit the PS-Poll-less MU DL transmission to the plurality of non-AP STAs in the PS-Poll-less PSM.

24 Claims, 6 Drawing Sheets

APPARATUS, SYSTEM, AND METHOD OF MULTI-USER (MU) TRANSMISSION

TECHNICAL FIELD

Aspects described herein generally relate to Multi-User (MU) transmission.

BACKGROUND

An Access Point (AP) and a plurality of wireless communication stations (STAs) may be configured to implement Multi-User (MU) Uplink (UL) and/or Downlink (DL) Orthogonal Frequency Division Multiple Access (OFDMA) transmissions, for example, in accordance with an IEEE802.11ax Standard.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
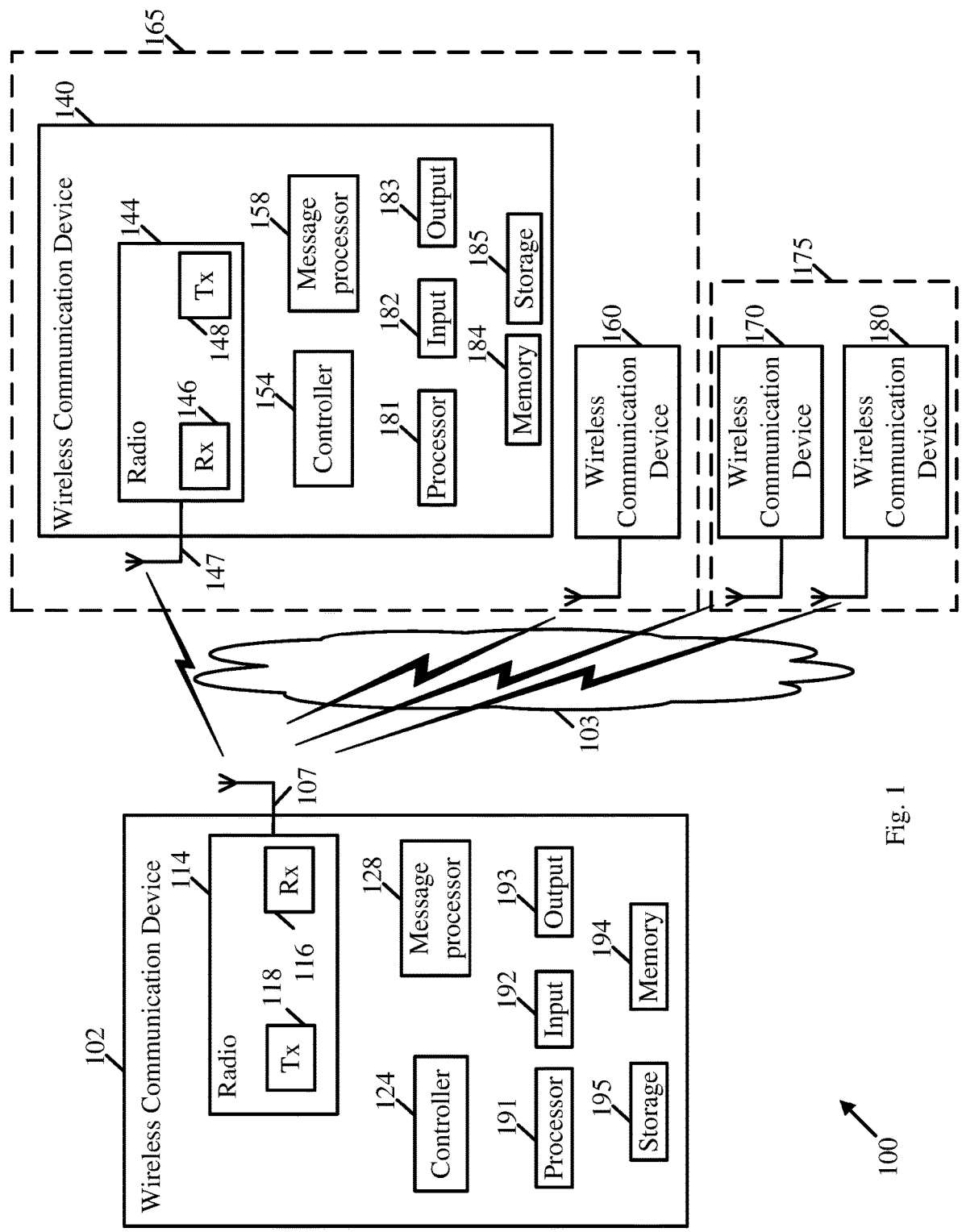
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a wireless Access Point (AP), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications*, Dec. 7, 2016), and IEEE 802.11ax (*IEEE P802.11ax/D8.0 Draft Standard for Information technology-Tele-communications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN*, October 2020); and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative aspects may be used in conjunction with a WLAN, e.g., a Wi-Fi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a frequency band of 2.4 GHz, 5 GHz and/or 6 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a sub-1 GHz (S1G) band, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Some demonstrative aspects are described herein with respect to Wi-Fi communication. However, other aspects may be implemented with respect to any other communication scheme, network, standard and/or protocol.

Reference is now made to FIG. 1, which schematically illustrates a block diagram of a system 100, in accordance with some demonstrative aspects.

As shown in FIG. 1, in some demonstrative aspects system 100 may include a wireless communication network including one or more wireless communication devices, e.g., wireless communication devices 102, 140, 160, 170 and/or 180, and/or one or more other wireless communication devices.

In some demonstrative aspects, wireless communication devices 102, 140, 160, 170 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, devices 102, 140, 160, 170 and/or 180 may include, operate as, and/or perform the functionality of one or more STAs. For example, devices 102, 140, 160, 170 and/or 180 may include at least one STA.

In some demonstrative aspects, devices 102, 140, 160, 170 and/or 180 may include, operate as, and/or perform the functionality of one or more WLAN STAs.

In some demonstrative aspects, devices 102, 140, 160, 170 and/or 180 may include, operate as, and/or perform the functionality of one or more Wi-Fi STAs.

In some demonstrative aspects, devices 102, 140, 160, 170 and/or 180 may include, operate as, and/or perform the functionality of one or more BT devices.

In some demonstrative aspects, devices 102, 140, 160, 170 and/or 180 may include, operate as, and/or perform the functionality of one or more Neighbor Awareness Networking (NAN) STAs.

In some demonstrative aspects, one or more of wireless communication devices 102, 140, 160, 170 and/or 180, e.g., device 102, may include, operate as, and/or perform the functionality of an Access Point (AP) station (STA).

For example, the AP may include a router, a PC, a server, a Hot-Spot and/or the like.

In some demonstrative aspects, devices 140, 160, 170 and/or 180 may be configured to operate as, and/or to perform the functionality of, non-access-point (non-AP) STA.

In one example, a STA may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative aspects, device 102 may include, for example, one or more of a processor 191, an input unit 192, an output unit 193, a memory unit 194, and/or a storage unit 195; and/or devices 140, 160, 170, and/or 180 may include one or more of a processor 181, an input unit 182, an output unit 183, a memory unit 184, and/or a storage unit 185. Devices 102, 140, 160, 170, and/or 180 may optionally include other suitable hardware components and/or software components. In some demonstrative aspects, some or all of the components of one or more of devices 102, 140, 160, 170 and/or 180 may be enclosed in a common housing or packaging, and may be interconnected or operably associated using one or more wired or wireless links. In other aspects, components of one or more of devices 102, 140, 160, 170 and/or 180 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an OS of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102, 140, 160, 170 and/or 180 may be capable of communicating content, data, information and/or signals via a wireless medium (WM) 103. In some demonstrative aspects, wireless medium 103 may include, for example, a radio channel, an RF channel, a Wi-Fi channel, a Bluetooth (BT) channel, a cellular channel, a Global Navigation Satellite System (GNSS) Channel, an IR channel, and the like.

In some demonstrative aspects, wireless communication medium 103 may include a wireless communication channel over a 2.4 Gigahertz (GHz) frequency band, a 5 GHz frequency band, a 6 GHz band, a millimeterWave (mmWave) frequency band, e.g., a 60 GHz frequency band, an S1G band, and/or any other frequency band.

In some demonstrative aspects, devices 102, 140, 160, 170 and/or 180 may include one or more radios including circuitry and/or logic to perform wireless communication between devices 102, 140, 160, 170 and/or 180, and/or one or more other wireless communication devices. For example, device 102 may include a radio 114, and/or device 140 may include at least one radio 144.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative aspects, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative aspects, radio 114 and/or radio 144, transmitters 118 and/or 148, and/or receivers 116 and/or 146 may include circuitry; logic; RF elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative aspects, radio 114 and/or radio 144 may be configured to communicate over a 2.4 GHz band, a 5 GHz band, a 6 GHz band, an mmWave band, a S1G band, and/or any other band.

In some demonstrative aspects, radios 114 and/or 144 may include, or may be associated with, one or more antennas 107 and/or 147, respectively.

In one example, device 102 may include a single antenna 107. In another example, device may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160, 170, 180, and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 160, 170, 180 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, at least part of the functionality of controller 124 may be implemented as part of any other element of device 102, and/or at least part of the functionality of controller 154 may be implemented as part of any other element of device 140.

In some demonstrative aspects, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative aspects, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processors 128 and/or 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processors 128 and/or 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114.

In some demonstrative aspects, at least part of the functionality of message processor 128 may be implemented as part of controller 124.

In other aspects, at least part of the functionality of message processor 128 may be implemented as part of any other element of device 102.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other aspects, controller 124, message processor 128 and/or radio 114 may be implemented by one or more additional or alternative elements of device 102.

In some demonstrative aspects, at least part of the functionality of message processor 158 may be implemented as part of radio 144.

In some demonstrative aspects, at least part of the functionality of message processor 158 may be implemented as part of controller 154.

In other aspects, at least part of the functionality of message processor 158 may be implemented as part of any other element of device 140.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other aspects, controller 154, message processor 158 and/or radio 144 may be implemented by one or more additional or alternative elements of device 140.

In some demonstrative aspects, wireless communication devices 102, 140, 160, 170 and/or 180 may form, or may communicate as part of, a wireless local area network (WLAN).

In some demonstrative aspects, wireless communication devices 102, 140, 160, 170 and/or 180 may form, or may communicate as part of, a Wi-Fi network.

In other aspects, wireless communication devices 102, 140, 160, 170 and/or 180 may form, and/or communicate as part of, any other additional or alternative network.

In some demonstrative aspects, device 102 may include, operate as, perform the role of, and/or perform one or more functionalities of an AP STA.

In some demonstrative aspects, devices 140, 160, 170 and/or 180 may include, operate as, perform the role of, and/or perform one or more functionalities of, one or more non-AP STAs. For example, devices 140, 160, 170 and/or 180 may include at least one non-AP STA.

In some demonstrative aspects, there may be a need to address one or more inefficiencies, disadvantages and/or technical problems in one or more use cases and/or scenarios, for example, for simultaneous Downlink (DL) transmissions to multiple STAs, and/or simultaneous Uplink (UL) transmissions from multiple STAs, for example, in accordance with one or more protocols and/or mechanisms, e.g., in accordance with one or more IEEE802.11 Standards, standard enhancements, and/or or any other standard or protocol, e.g., as described below.

In some demonstrative aspects, devices 102, 140, 160, 170 and/or 180 may be configured to implement Multi-User (MU) UL and/or Downlink (DL) transmissions, for example, in accordance with an IEEE802.11ax Standard and/or any other standard and/or protocol, e.g., as described below.

In some demonstrative aspects, devices 102, 140, 160, 170 and/or 180 may be configured to implement MU UL and/or Downlink (DL) Orthogonal Frequency Division Multiple Access (OFDMA) transmissions, for example, in accordance with an IEEE802.11ax Standard and/or any other standard and/or protocol, e.g., as described below.

In other aspects, any other type of MU DL and/or MU UL transmissions may be utilized.

In some demonstrative aspects, MU OFDMA transmissions may implemented, for example, to improve system throughput performance, for example, by reducing a channel access overhead, e.g., in densely deployed Wi-Fi environments.

In some demonstrative aspects, an AP STA may be configured to schedule a MU DL transmission and/or a MU UL transmission with multiple non-AP STAs, for example, according to a MU scheduling mechanism, e.g., in accordance with the IEEE802.11ax Standard and/or any other standard and/or protocol. For example, the MU scheduling mechanism may provide a technical solution to eliminate a need for individual non-AP STAs to compete for channel access, which may make overall channel access less efficient.

In some demonstrative aspects, an AP STA, for example, an AP STA implemented by device 102, may schedule a simultaneous downlink transmission for multiple non-AP STAs, for example, non-AP STAs implemented by devices 140, 160, 170 and/or 180. For example, the simultaneous downlink transmission may utilize a MU PPDU, e.g., a single MU PPDU, which may be configured for simultaneous transmission to the plurality of non-AP STAs. For example, the AP STA may schedule the simultaneous downlink transmission by allocating among the non-AP STAs a plurality of non-overlapping frequency resources, e.g., in the form of a plurality of Resource Units (RUs).

In some demonstrative aspects, the AP STA may transmit a frame, e.g., a control frame, for example, a trigger frame, which may be configured to solicit a MU UL transmission including simultaneous uplink transmissions from multiple non-AP STAs.

In some demonstrative aspects, in order for the non-AP STAs to be able to participate in communication of the MU DL transmission and/or the MU UL transmission, the non-AP STAs may need to be in an active mode of operation, for example, to be ready to communicate the MU DL and/or UL transmission. However, in some use cases and/or implementations, some or even all of the non-AP STAs may prefer to operate in a Power Save Mode (PSM), for example, to minimize their power consumption.

In some demonstrative aspects, the AP STA may wake up target non-AP STAs, e.g., prior to scheduling a MU DL and/or UL transmission, for example, by indicating a presence of buffered data.

In some demonstrative aspects, the AP STA may be configured to utilize a Traffic Indication Map (TIM) element in beacon frame transmissions, for example, to indicate the presence of the buffered data for one or more non-AP STAs.

In some demonstrative aspects, for example, in some use cases, scenarios and/or implementations, there may be one or more technical issues in a MU transmission protocol, which is based on power state indications from the non-AP STAs. For example, such a MU transmission protocol may require the AP STA to wait for the non-AP STAs to send power state indications, e.g., Power Save (PS)-Poll frames, in response to the beacon frame, for example, before the AP STA is allowed to schedule the MU DL and/or UL transmissions to the non-AP STAs.

For example, a MU transmission frame, which is based on the PS-Poll frames, may cause a delay in the MU downlink and/or uplink transmissions. Such a delay may have adverse impact on throughput and/or latency performance.

In some demonstrative aspects, for example, in some use cases, scenarios and/or implementations, there may be one or more technical issues in a MU transmission protocol, which is based on the AP STA scheduling overlapping Target Wake Time (TWT) service periods (SPs) for a group of non-AP STAs and/or for a limited number of non-AP STAs groups to facilitate MU DL and/or UL transmissions. For example, such a protocol may lack flexibility for practical scenarios, e.g., where the non-AP STAs groups may change dynamically.

In some demonstrative aspects, for example, in some use cases, scenarios and/or implementations, there may be one or more technical issues in a MU transmission protocol, which is based on an Opportunistic Power Save (OPS) mechanism. For example, the OPS mechanism may be not applicable to STAs in a PSM, as the OPS mechanism requires that STAs are to be awake in order to receive an OPS frame.

In some demonstrative aspects, devices 102, 140, 160, 170 and/or 180 may be configured to support an enhanced PSM, for example, a Power Save (PS) poll-less (PS-Poll-less) PSM, which may be configured to support communication of a MU transmission, for example, even without the use of a power-state indication, e.g., a PS-Poll frame, e.g., as described below.

In some demonstrative aspects, devices 102, 140, 160, 170 and/or 180 may be configured to pre-negotiate whether or not PS-poll frames are to be required for transmission during the PSM, e.g., as described below.

In some demonstrative aspects, an AP STA, e.g., device 102, may be configured to negotiate with a non-AP STA, e.g., as STA implemented by device 140, device 160, device 170 and/or device 180, whether or not the STA is to operate in the PS-Poll-less PSM, e.g., as described below.

In one example, the negotiation of the negotiation of the Poll-less PSM may be performed as part of an association procedure, and/or as part of any other procedure.

In some demonstrative aspects, the PS-Poll-less PSM may be configured to provide a technical solution, which may eliminate the need to communicate power state indications, e.g., PS-poll frames, between devices 102, 140, 160, 170 and/or 180, e.g., in response to a beacon frame, for example, prior to a MU transmission.

In some demonstrative aspects, an AP STA, e.g., implemented by device 102, may be allowed to schedule a MU DL transmission and/or a MU UL transmission with non-AP STAs operating in the PS-Poll-less PSM, for example, without having the AP STA wait for multiple PS-Poll frames from the non-AP STAs in response to the beacon frame, e.g., as described below.

In some demonstrative aspects, device 102 may be configured to group two or more non-AP STAs from devices 140, 160, 170 and/or 180 into one or more groups, for example, for one or more MU DL transmissions, e.g., as described below.

In some demonstrative aspects, controller 124 may be configured to control, cause and/or trigger an AP STA implemented by device 102 to group a plurality of non-AP STAs, e.g., devices 140, 160, 170 and/or 180, into one or more groups, e.g., including one or more groups 165 and/or 175, as described below.

In some demonstrative aspects, the MU DL transmissions may include a PS-Poll-less PSM MU DL transmission, for example, for a group of non-AP STAs in a PS-Poll-less PSM, e.g., as described below.

In some demonstrative aspects, the PS-Poll-less MU DL transmission may include a MU DL OFDMA transmission.

In other aspects, the PS-Poll-less MU DL transmission may include ay other type of MU DL transmission. In some demonstrative aspects, controller 124 may be configured to control, cause and/or trigger the AP STA implemented by device 102 group a first plurality of non-AP STAs, e.g., including device 140 and/or device 160, into one or more first groups 165; and/or to group a second plurality of non-AP STAs, e.g., including device 170 and/or device 180, into one or more second groups 175, e.g., as described below.

In some demonstrative aspects, controller 124 may be configured to control, cause and/or trigger the AP STA implemented by device 102 to include in the one or more groups 165 non-AP STAs, which may be configured to operate in a PS-Poll-less PSM, e.g., as described below.

In some demonstrative aspects, controller 124 may be configured to control, cause and/or trigger the AP STA implemented by device 102 to include in the one or more groups 175 non-AP STAs, which may be configured to operate in PSM, for example, using the PS-Poll frames, and/or non-AP STAs which may operate in one or more other power save modes, e.g., as described below.

In some demonstrative aspects, controller 124 may be configured to control, cause and/or trigger the AP STA implemented by device 102 to identify a plurality of non-AP STAs, e.g., the non-AP STAs implemented by devices 140 and/or 160, in a PS-Poll-less PSM to be addressed by a PS-Poll-less MU DL transmission, e.g., as described below.

In some demonstrative aspects, the PS-Poll-less MU DL transmission may be configured as a MY DL transmission, which does not require prior receipt of PS Poll frames from the non-AP STAs in the PS-Poll-less PSM, e.g., as described below.

In some demonstrative aspects, controller 124 may be configured to control, cause and/or trigger the AP STA implemented by device 102 to transmit a beacon frame including a traffic indication to indicate that traffic is pending for transmission from device 102 to the non-AP STAs in the PS-Poll-less PSM, for example, devices 140 and/or 160, e.g., as described below.

In some demonstrative aspects, the traffic indication may include a traffic Indication Map (TIM) element including identifiers of the non-AP STAs, e.g., devices 140 and/or 160, in the PS-Poll-less PSM. In other aspects, the traffic indication may include any other additional or alternative element to identify the non-AP STAs in the PS-Poll-less PSM for which traffic is pending.

In some demonstrative aspects, controller 124 may be configured to control, cause and/or trigger the AP STA implemented by device 102 to transmit the PS-Poll-less MU DL transmission to the non-AP STAs in the PS-Poll-less PSM, e.g., device 140 and/or 160, for example, subsequent to the beacon frame, e.g., as described below.

In some demonstrative aspects, controller 124 may be configured to control, cause and/or trigger radio 114 to transmit the beacon frame and the PS-Poll-less MU DL transmission.

In some demonstrative aspects, controller 124 may be configured to control, cause and/or trigger the AP STA implemented by device 102 to transmit to a non-AP STA of the plurality of non-AP STAs, e.g., device 140, a PS-Poll-less PSM operation indication configured to indicate that the non-AP STA is to operate in the PS-Poll-less PSM, e.g., as described below.

In some demonstrative aspects, controller 124 may be configured to control, cause and/or trigger the AP STA implemented by device 102 to transmit the PS-Poll-less PSM operation indication to device 140, for example, based on a capability indication from device 140, e.g., as described below.

In some demonstrative aspects, the capability indication from device 140 may indicate that device 140 is capable of operating in the PS-Poll-less PSM.

In some demonstrative aspects, controller 124 may be configured to control, cause and/or trigger the AP STA implemented by device 102 to communicate with a non-AP STA of the plurality of non-AP STAs, e.g., device 140, one or more negotiation messages to negotiate a configuration of the PS-Poll-less PSM, e.g., as described below.

In some demonstrative aspects, controller 124 may be configured to control, cause and/or trigger the AP STA implemented by device 102 to communicate with a non-AP STA of the plurality of non-AP STAs, e.g., device 140, one or more negotiation messages to negotiate a time period between the beacon frame and the PS-Poll-less MU DL transmission, e.g., as described below.

In some demonstrative aspects, controller 124 may be configured to control, cause and/or trigger the AP STA implemented by device 102 to transmit the PS-Poll-less MU DL transmission separated from the beacon frame by a PS-poll-less time period, e.g., as described below.

In some demonstrative aspects, the PS-poll-less time period may include no communication of any PS-poll frame from devices 140 and/or 160 in the PS-Poll-less PSM to device 102.

In some demonstrative aspects, controller 124 may be configured to control, cause and/or trigger the AP STA implemented by device 102 to transmit the PS-Poll-less MU DL transmission separated from the beacon frame, for example, by a predefined time period, e.g., as described below.

In some demonstrative aspects, the beacon frame may include an indication of the predefined time period, e.g., as described below.

In some demonstrative aspects, controller 124 may be configured to control, cause and/or trigger the AP STA implemented by device 102 to transmit the PS-Poll-less MU DL transmission a Short-Inter-Frame-Space (SIFS) period after the beacon frame, e.g., as described below.

In other demonstrative aspects, device 102 may transmit the PS-Poll-less MU DL transmission separated from the beacon frame by any other period of time.

In some demonstrative aspects, controller 154 may be configured to control, cause and/or trigger a non-AP STA implemented by device 140 to operate in PS-Poll-less PSM, e.g., as described below.

In some demonstrative aspects, controller 154 may be configured to control, cause and/or trigger the non-AP STA implemented by device 140 to process a traffic indication in the beacon frame from an AP STA, e.g., the beacon frame from device 102, for example, to determine whether traffic is pending for transmission from the AP STA to the non-AP STA in the PS-Poll-less PSM, e.g., as described below.

In some demonstrative aspects, the traffic indication may include a TIM element including identifiers of the of the plurality of non-AP STAs in the PS-Poll-less PSM, e.g., identifiers of the non-AP STAs implemented by devices of group 165.

In some demonstrative aspects, controller 154 may be configured to control, cause and/or trigger the non-AP STA implemented by device 140 to refrain from transmission of a PS Poll frame to device 102, and wait to receive from device 102 the PS-Poll-less MU DL transmission, for example, based on a determination that traffic is pending for transmission from device 102 to device 140 in the PS-Poll-less PSM, e.g., as described below.

In some demonstrative aspects, the PS-Poll-less MU DL transmission may include a MU DL transmission, which does not require prior receipt of PS Poll frames from a plurality of non-AP STAs in the PS-Poll-less PSM.

In some demonstrative aspects, controller 154 may be configured to control, cause and/or trigger the non-AP STA implemented by device 140 to operate in the PS-Poll-less PSM, for example, based on a PS-Poll-less PSM operation indication from device 102 to indicate that the non-AP STA implemented by device 140 is to operate in the PS-Poll-less PSM.

In some demonstrative aspects, controller 154 may be configured to control, cause and/or trigger the non-AP STA implemented by device 140 to transmit to device 102 a capability indication to indicate that non-AP STA implemented by device 140 is capable of operating in the PS-Poll-less PSM.

In some demonstrative aspects, controller 154 may be configured to control, cause and/or trigger the non-AP STA implemented by device 140 to communicate with the AP STA implemented by device 102 one or more negotiation messages, for example, to negotiate a configuration of the PS-Poll-less PSM, e.g., as described below.

In some demonstrative aspects, controller 154 may be configured to control, cause and/or trigger the non-AP STA implemented by device 140 to communicate with the AP STA implemented by device 102 one or more negotiation messages, for example, to negotiate a time period between the beacon frame and the PS-Poll-less MU DL transmission, e.g., as described below.

In some demonstrative aspects, controller 154 may be configured to control, cause and/or trigger the non-AP STA implemented by device 140 to wait to receive the PS-Poll-less MU DL transmission separated from the beacon frame by a PS-poll-less time period, which does not include communication of any PS-poll frame from the non-AP STAs in the PS-Poll-less PSM, e.g., the devices of group 165, to the AP STA implemented by device 102, e.g., as described below.

In some demonstrative aspects, controller 154 may be configured to control, cause and/or trigger the non-AP STA implemented by device 140 to wait to receive the PS-Poll-less MU DL transmission separated from the beacon frame by a predefined time period, e.g., as described below.

In some demonstrative aspects, the beacon frame may include an indication of the predefined time period.

In some demonstrative aspects, controller 154 may be configured to control, cause and/or trigger the non-AP STA implemented by device 140 to wait to receive the PS-Poll-less MU DL transmission a SIFS period after the beacon frame, e.g., as described below.

In other demonstrative aspects, device 140 may wait to receive the PS-Poll-less MU DL transmission for any other additional and/or alternative time period.

Figure 2:
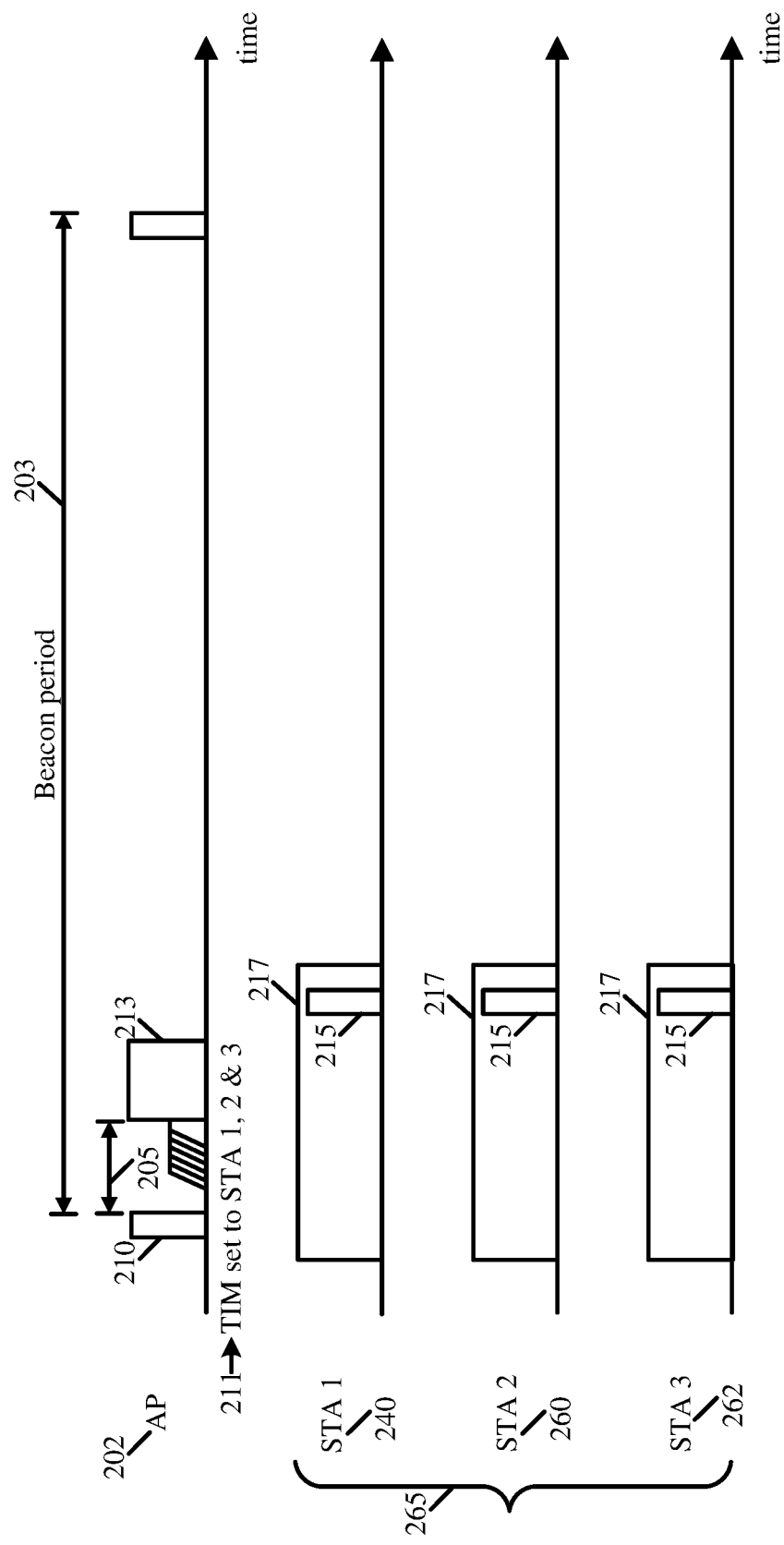
FIG. 2 is a schematic a sequence diagram of a Multi-User (MU) downlink (DL) transmission, in accordance with some demonstrative aspects.

Reference is made to FIG. 2, which schematically illustrates a sequence diagram 200 of a MU DL transmission, in accordance with some demonstrative aspects.

In some demonstrative aspects, one or more of the communications of sequence diagram 200 may be performed by an AP STA 202 and a group 265 of non-AP STAs.

For example, device 102 (FIG. 1) may perform one or more operations of, the functionality of, and/or the role of, AP STA 202, and/or devices 140 and/or 160 (FIG. 1) of group 165 (FIG. 1) may perform one or more operations of, the functionality of, and/or the role of, the non-AP STAs in group 265.

In some demonstrative aspects, as shown in FIG. 2, group 265 of non-AP STAs may include a non-AP STA 240, a non-AP STA 260, and/or non-AP STA 262, which may be configured to operate in a PS-Poll-less PSM. For example, devices 140 and/or 160 (FIG. 1) may perform one or more operations of, the functionality of, and/or the role of, non-AP STA 240, non-AP STA 260, and/or non-AP STA 262.

In some demonstrative aspects, as shown in FIG. 2, AP STA 202 may be configured to communicate MU DL and/or UL transmissions with non-AP STA 240, non-AP STA 260, and/or non-AP STA 262 during a beacon period 203, e.g., as described below.

In some demonstrative aspects, AP STA 202 may be configured to identify that the non-AP STAs of group 265 are operating in the PS-Poll-less PSM, which may allow the AP STA 202 to transmit to the non-AP STAs of group 265 a PS-Poll-less MU DL transmission 213, which does not require prior receipt of PS Poll frames from the non-AP STAs of group 265 in the PS-Poll-less PSM.

In some demonstrative aspects, based on the determination that the non-AP STAs of group 265 are in the PS-Poll-less PSM, the AP STA 202 may assume that the non-AP STAs of group 265 are to available, e.g., in the awake state. Accordingly, the non-AP STA 202 may be allowed to proceed to transmit the downlink MU PPDU or a trigger frame for uplink MU PPDU transmissions, e.g., following transmission of a beacon frame. This mechanism may provide a technical solution to eliminate a need for the non-AP STAs to contend and send PS-Poll frames, which may consume air-time, may introduce contention, and/or may waste power of the non-AP STAs. Accordingly, PS-Poll-less PSM may be implemented to provide a technical solution to support improved throughput, latency and/or energy efficient MU downlink and/or uplink transmissions.

In some demonstrative aspects, based on identifying the non-AP STAs of group 265 are in the PS-Poll-less PSM, AP STA 202 may have no need to wait for power state indications, for example, PS Poll frames, from the non-AP STAs of group 265, for example, before transmitting PS-Poll-less MU DL transmission 213 to the non-AP STAs of group 265.

In some demonstrative aspects, as shown in FIG. 2, AP STA 202 may be configured to transmit a beacon frame 210 including a traffic indication to the non-AP STAs of group 265.

In some demonstrative aspects, AP STA 202 may configure the traffic indication to indicate that traffic is pending for transmission from AP STA 202 to the non-AP STAs of group 265 operating in the PS-Poll-less PSM.

In some demonstrative aspects, the traffic indication may include a TIM element 211 including identifiers of one or more non-AP STAs, e.g., non-AP STA 240, non-AP STA 260, and/or non-AP STA 262, operating in the PS-Poll-less PSM.

In some demonstrative aspects, AP STA 202 may assume that the non-AP STAs of group 265, for which the TIM element 211 in beacon frame 210 is set to a predefined value to indicate pending traffic, e.g., "1", would remain in the awake state, for example, when identifying that the non-AP STAs of group 265 operate in the PS-Poll-less PSM.

In other aspects, TIM element 211 may be set to any other additional and/or alternative value to indicate pending traffic for the non-AP STAs.

In other aspects, the beacon frame 210 may include any other element or indication to indicate the pending traffic.

In some demonstrative aspects, as shown in FIG. 2, AP STA 202 may be configured to transmit PS-Poll-less MU DL transmission 213 to the non-AP STAs of group 265 in the PS-Poll-less PSM, for example, subsequent to beacon frame 210.

For example, AP STA 202 may initiate transmission of PS-Poll-less MU DL transmission 213 without waiting to receive PS-Poll frames from the non-AP STAs of group 265, for example, when the non-AP STAs of group 265 operate in the PS-Poll-less PSM.

In some demonstrative aspects, AP STA 202 may pre-negotiate the PS-Poll-less PSM with the non-AP STAs of group 265, for example, according to a signaling mechanism between AP STA 202 and the non-AP STAs of group 265.

In some demonstrative aspects, AP STA 202 may be configured to transmit to one or more of the non-AP STAs, e.g., non-AP STA 240, non-AP STA 260, and/or non-AP STA 262, a PS-Poll-less PSM operation indication configured to indicate that non-AP STA 240, non-AP STA 260, and/or non-AP STA 262 are to operate in the PS-Poll-less PSM.

In some demonstrative aspects, AP STA 202 may be configured to transmit the PS-Poll-less PSM operation indication to one or more of the non-AP STAs, e.g., non-AP STA 240, non-AP STA 260, and/or non-AP STA 262, for example, based on capability indications from non-AP STA 240, non-AP STA 260, and/or non-AP STA 262.

For example, the capability indication from a non-AP STA may indicate that the non-AP STA is capable of operating in the PS-Poll-less PSM.

In some demonstrative aspects, AP STA 202 may be configured to communicate with non-AP STA 240, non-AP STA 260, and/or non-AP STA 262 one or more negotiation messages to negotiate a configuration of the PS-Poll-less PSM.

In some demonstrative aspects, as shown in FIG. 2, AP STA 202 may be configured to transmit PS-Poll-less MU DL transmission 213 separated from beacon frame 210 by a time period 205.

In some demonstrative aspects, the time period 205 may include a PS-poll-less time period, which does not include communication of any PS-poll frame from the non-AP STAs in the PS-Poll-less PSM, e.g., the non-AP STAs of group 265, to AP STA 202.

In some demonstrative aspects, AP STA 202 may be configured to communicate with non-AP STA 240, non-AP STA 260, and/or non-AP STA 262 one or more negotiation messages to negotiate the time period 205 between beacon frame 210 and PS-Poll-less MU DL transmission 213.

In some demonstrative aspects, AP STA 202 may be configured to transmit PS-Poll-less MU DL transmission 213 separated from beacon frame 210 by a predefined time period 205.

For example, beacon frame 210 may include an indication of the predefined time period 205.

In some demonstrative aspects, time period 205 may include a SIFS period.

For example, AP STA 202 may be configured to transmit PS-Poll-less MU DL transmission 213 a SIFS period after beacon frame 210.

In other demonstrative aspects, time period 205 may include a time period of any other duration.

In some demonstrative aspects, as shown in FIG. 2, non-AP STA 240, non-AP STA 260, and/or non-AP STA 262 may transmit an acknowledgement 215 to AP STA 202, for example, to acknowledge receipt of PS-Poll-less MU DL transmission 213.

Figure 3:
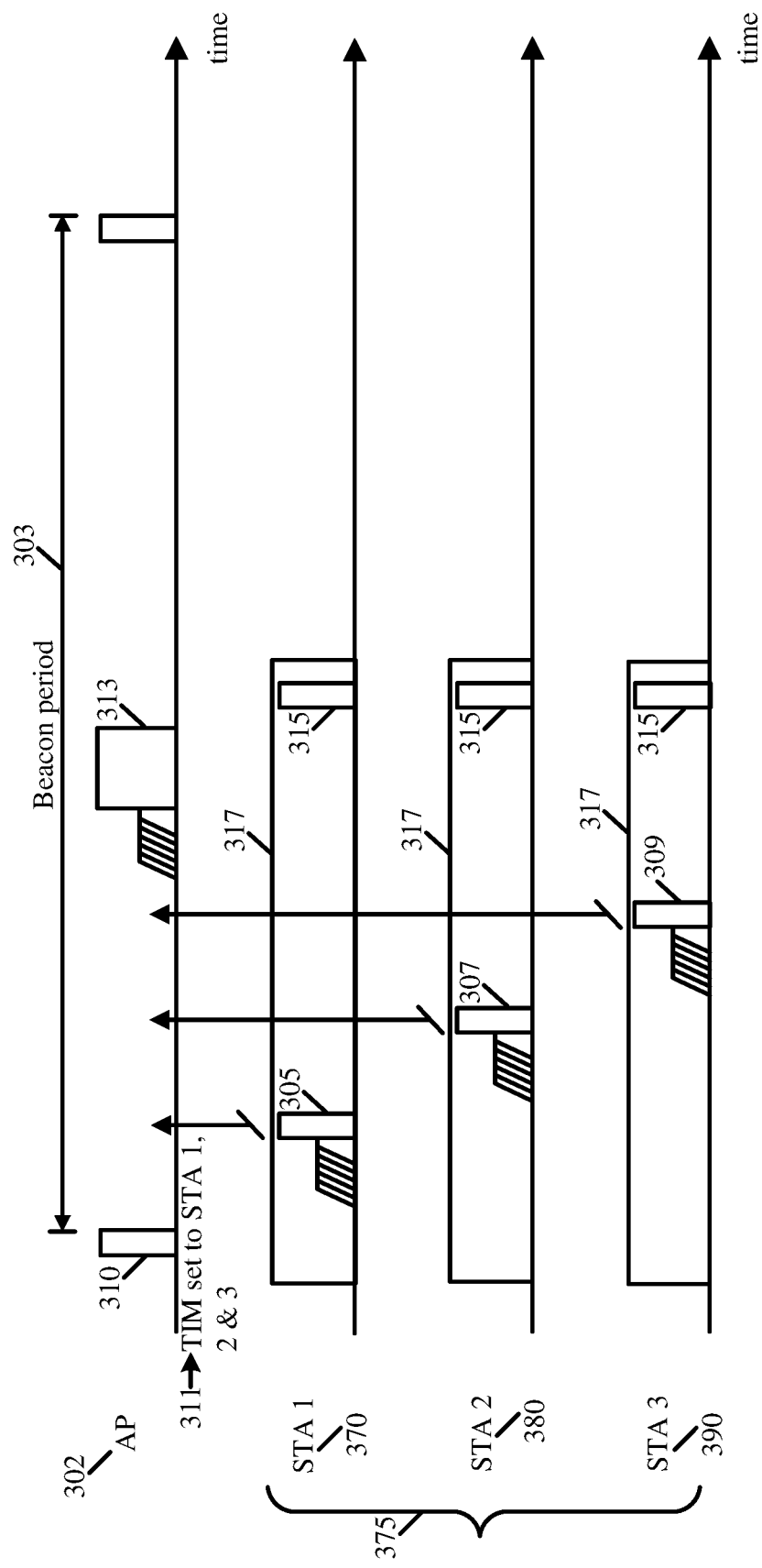
FIG. 3 is a schematic a sequence diagram of a MU DL transmission, in accordance with some demonstrative aspects.

In some demonstrative aspects, a PS-poll-less PSM mechanism, e.g., as shown in FIG. 3, may improve throughput, latency and/or energy efficiency for MU DL and/or UL transmissions, for example, by eliminating the need for communication of PS poll frames that consume air-time, introduce contention, and waste power of the STAs.

For example, an activity period 217 of non-AP STAs of group 265 may be relatively short, for example, when non-AP STAs of group 265 operate in the PS-Poll-less PSM.

Referring back to FIG. 1, in some demonstrative aspects, device 102 may communicate a MU DL and/or UL transmission with an other plurality of non-AP STAs, e.g., a group 175 of non-AP STAs, which may not operate in the PS-Poll-less PSM. In one example, non-AP STAS of the group 175 may operate in a PSM, which may utilize PS-Poll frames, e.g., as described below.

In some demonstrative aspects, controller 124 may be configured to control, cause and/or trigger the AP STA implemented by device 102 to transmit a beacon frame including a traffic indication to indicate that traffic is pending for transmission from the AP STA implemented by device 102 to the non-AP STAs of group 175, which may be operating in the PSM, e.g., as described below.

In some demonstrative aspects, controller 124 may be configured to control, cause and/or trigger the AP STA implemented by device 102 to transmit a beacon frame including a traffic indication to indicate that traffic is pending for transmission from the AP STA to a plurality of non-AP STAs in the PS-Poll-less PSM, e.g., to non-AP STAs of the group 165; and to indicate that traffic is pending for transmission from the AP STA to a plurality of non-AP STAs in the PSM, e.g., to non-AP STAs of the group 167.

In some demonstrative aspects, the traffic indications to the groups 165 and 175 may be transmitted as part of a same beacon frame. In other aspects, the traffic indications to the groups 165 and 175 may be transmitted as part of a separate beacon frames.

In some demonstrative aspects, controller 124 may be configured to control, cause and/or trigger the AP STA implemented by device 102 to transmit a MU DL transmission to the non-AP STAs in the PSM, e.g., devices 170 and/or 180 of group 175, for example, based on receipt of PS poll frames from the non-AP STAs of group 175 subsequent to the beacon frame, e.g., as described below.

Reference is made to FIG. 3, which schematically illustrates a sequence diagram 300 of a MU DL transmission, in accordance with some demonstrative aspects.

In some demonstrative aspects, one or more of the communications of sequence diagram 300 may be performed by an AP STA 302 and a group 375 of non-AP STAs.

For example, device 102 (FIG. 1) may perform one or more operations of, the functionality of, and/or the role of, AP STA 302, and/or one or more devices of group 175 (FIG. 1) may perform one or more operations of, the functionality of, and/or the role of, the non-AP STAs of group 375.

In some demonstrative aspects, as shown in FIG. 3, the group 375 of non-AP STAs may include a non-AP STA 370, a non-AP STA 380, and/or a non-AP STA 390, which operate in a PSM. For example, devices 170 and/or 180 (FIG. 1) may perform one or more operations of, the functionality of, and/or the role of, non-AP STA 370, non-AP STA 380, and/or non-AP STA 390.

In some demonstrative aspects, AP STA 302 may be configured to communicate MU DL and/or UL transmissions with non-AP STA 370, non-AP STA 380, and/or non-AP STA 390 during a beacon period 303.

In some demonstrative aspects, non-AP STA 370, non-AP STA 380, and/or non-AP STA 390 may be required to be in an active mode to be able to communicate MU DL and/or UL transmissions with AP STA 302.

In some demonstrative aspects, as shown in FIG. 3, AP STA 302 may be configured to transmit a beacon frame 310 including a traffic indication to the non-AP STAs of group 375.

In some demonstrative aspects, AP STA 302 may configure the traffic indication in beacon 310 to indicate that traffic is pending for transmission from AP STA 302 to the non-AP STAs of group 375.

For example, as shown in FIG. 3, the traffic indication may include a TIM element 311 including identifiers of non-AP STA 370, non-AP STA 380, and/or non-AP STA 390. For example, Tim element 311 may be configured to indicate that traffic is pending for a transmission from AP STA 302 to the non-AP STAs of group 375.

In some demonstrative aspects, the non-AP STAs of group 375 may be required to transmit to AP STA 302 power state indications, for example, in the form of PS-poll frames, to indicate that non-AP STA 370, non-AP STA 380, and/or non-AP STA 390 are in the active mode and ready to receive traffic form the AP STA 302.

In some demonstrative aspects, as shown in FIG. 3, non-AP STA 370 may transmit a PS-Poll frame 305 to AP STA 302, non-AP STA 380 may transmit a PS-Poll frame 307 to AP STA 302, and/or non-AP STA 390 may transmit a PS-Poll frame 309 to AP STA 302, for example, subsequent to reception of the beacon frame 310.

In some demonstrative aspects, PS-poll frames 305, 307, and/or 309 may be configured to indicate to AP STA 302 that non-AP STA 370, non-AP STA 380, and/or non-AP STA 390, are in the active mode and are ready to receive transmissions from AP STA 302.

In some demonstrative aspects, as shown in FIG. 3, AP STA 302 may be configured to transmit a MU DL transmission 313 to non-AP STA 370, non-AP STA 380, and/or non-AP STA 390, for example, based on reception of the PS-poll frames 305, 307, and/or 309. For example, AP STA 302 may wait to receive the PS-poll frames 305, 307, and/or 309, for example, before initiating transmission of the MU DL transmission 313 to non-AP STA 370, non-AP STA 380, and/or non-AP STA 390.

In some demonstrative aspects, as shown in FIG. 3, non-AP STA 370, non-AP STA 380, and/or non-AP STA 390 may transmit an acknowledgement 315 to AP STA 302, for example, to acknowledge receipt of MU DL transmission 313.

In some demonstrative aspects, the communication of PS poll frames 305, 307, and/or 309, e.g., before the transmission of MU DL transmission 313, may result in an activity period 317 of the non-AP STAs of group 375 to be relatively long, for example, in comparison to activity period 217 (FIG. 2) for the group of non-AP STAs in the PS-Poll-less PSM.

For example, this longer activity period 317 may result in increased power consumption of the non-AP STAs of group 375.

Figure 4:
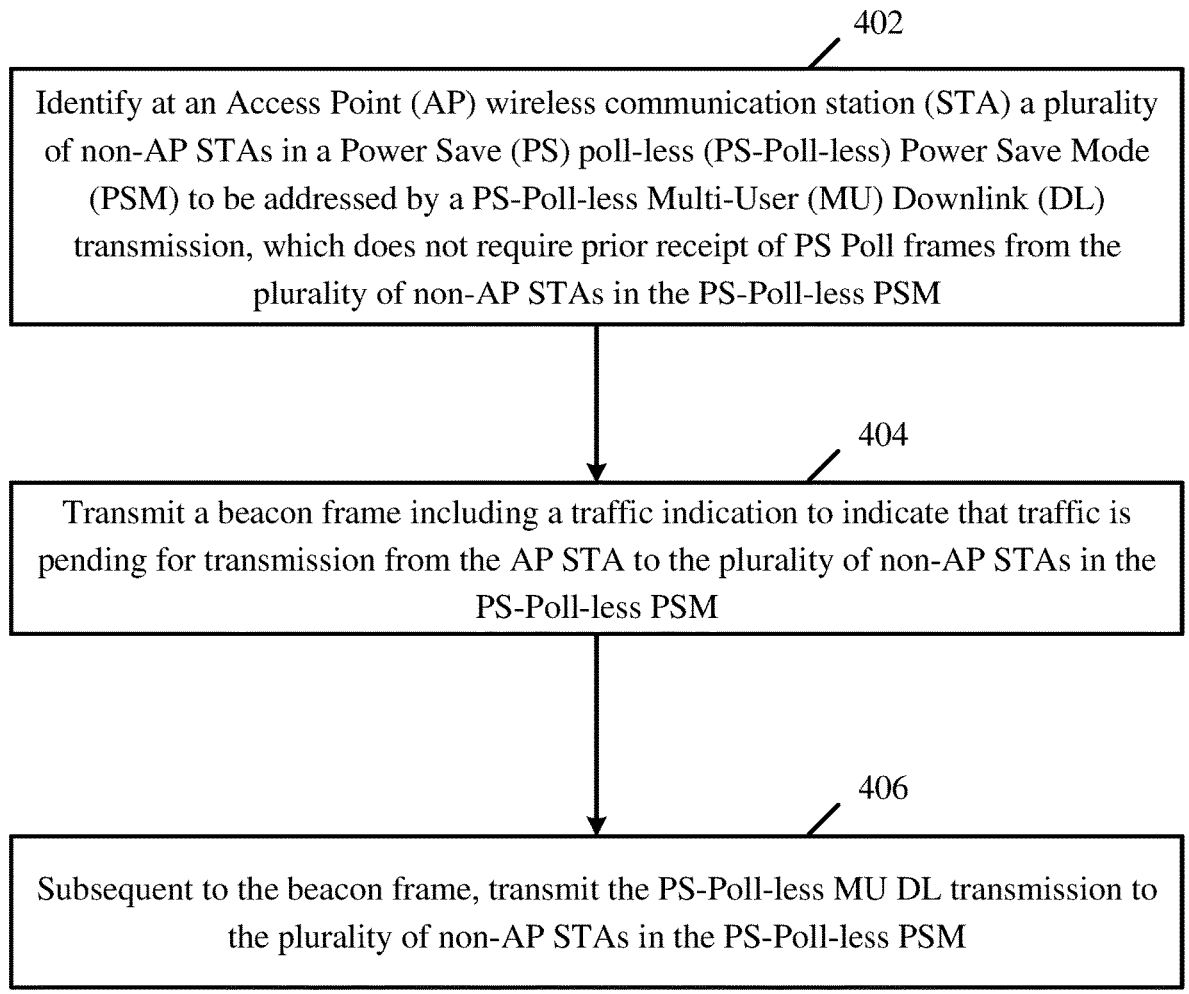
FIG. 4 is a schematic flow-chart illustration of a method of MU DL transmission, in accordance with some demonstrative aspects.

Reference is made to FIG. 4, which schematically illustrates a method of MU DL transmission, in accordance with some demonstrative aspects. For example, one or more of the operations of the method of FIG. 4 may be performed by a wireless communication system, e.g., system 100 (FIG. 1); a wireless communication device, e.g., device 102 (FIG. 1), device 140 (FIG. 1), and/or device 160 (FIG. 1); a controller, e.g., controller 124 (FIG. 1), and/or controller 154 (FIG. 1); a radio, e.g., radio 114 (FIG. 1), and/or radio 144 (FIG. 1); a message processor, e.g., message processor 128 (FIG. 1), and/or message processor 158 (FIG. 1); a transmitter, e.g., transmitter 118 (FIG. 1), and/or transmitter 148 (FIG. 1); and/or a receiver, e.g., receiver 116 (FIG. 1), and/or receiver 146 (FIG. 1).

In some demonstrative aspects, as indicated at block 402, the method may include identifying, at an AP STA, a plurality of non-AP STAs in a PS-Poll-less PSM to be addressed by a PS-Poll-less MU DL transmission, which does not require prior receipt of PS Poll frames from the plurality of non-AP STAs in the PS-Poll-less PSM. For example, controller 124 (FIG. 1) may control, cause and/or trigger an AP STA implemented by device 102 (FIG. 1) to identify non-AP STAs, e.g., implemented by devices 140 and/or 160 (FIG. 1), in a PS-Poll-less PSM to be addressed by a PS-Poll-less MU DL transmission, which does not require prior receipt of PS Poll frames from the non-AP STAs in the PS-Poll-less PSM, e.g., as described above.

In some demonstrative aspects, as indicated at block 404, the method may include transmitting a beacon frame including a traffic indication to indicate that traffic is pending for transmission from the AP STA to the plurality of non-AP STAs in the PS-Poll-less PSM. For example, controller 124 (FIG. 1) may control, cause and/or trigger the AP STA implemented by device 102 (FIG. 1) to transmit the beacon frame including the traffic indication to indicate that traffic is pending for transmission from device 102 (FIG. 1) to devices 140 and/or 160 (FIG. 1) in the PS-Poll-less PSM, e.g., as described above.

In some demonstrative aspects, as indicated at block 406, the method may include transmitting the PS-Poll-less MU DL transmission to the plurality of non-AP STAs in the PS-Poll-less PSM, for example, subsequent to the beacon frame. For example, controller 124 (FIG. 1) may control, cause and/or trigger the AP STA implemented by device 102 (FIG. 1) to transmit the PS-Poll-less MU DL transmission to devices 140 and/or 160 (FIG. 1) in the PS-Poll-less PSM, for example, subsequent to the beacon frame, e.g., as described above.

Figure 5:
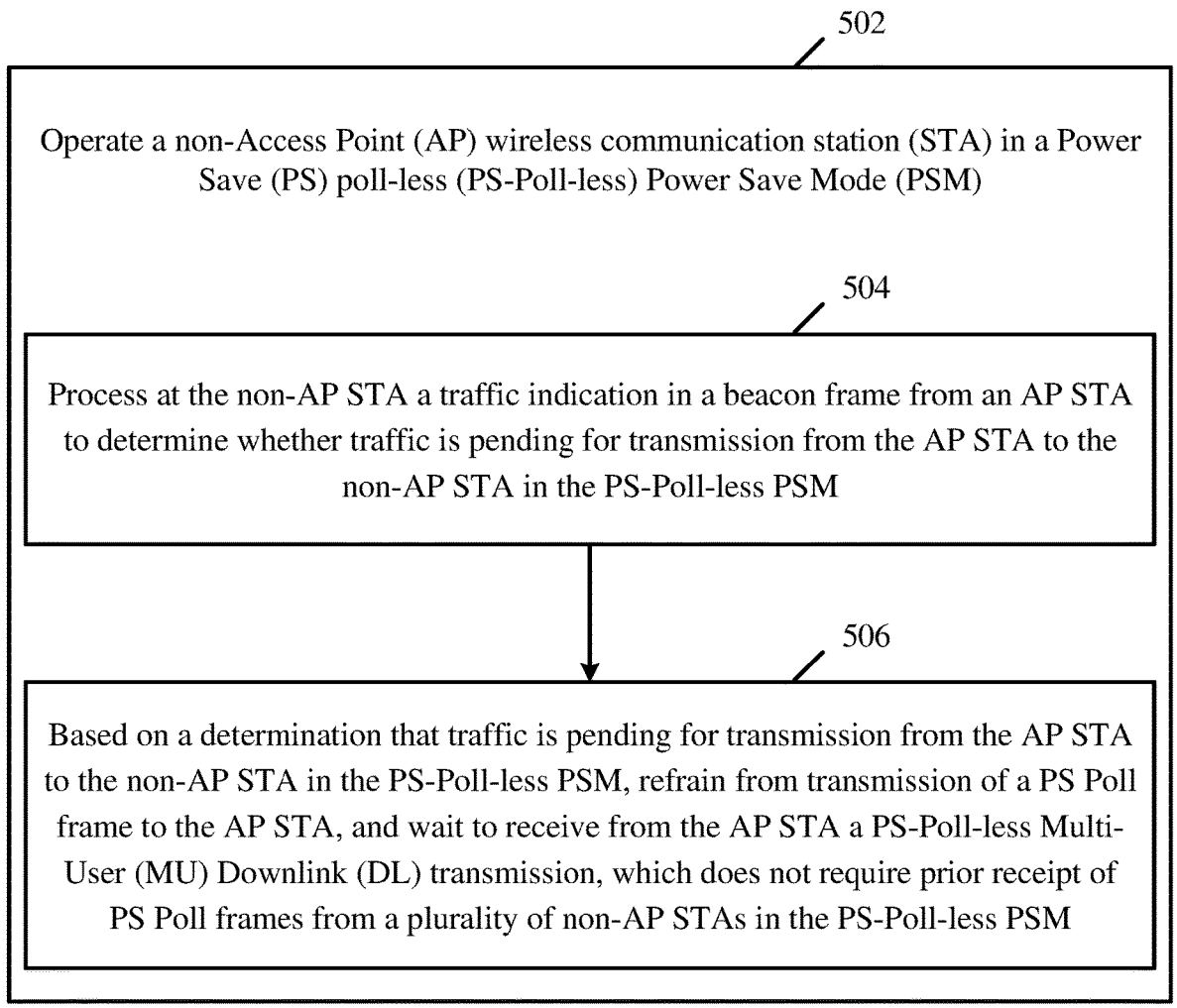
FIG. 5 is a schematic flow-chart illustration of a method of MU DL transmission, in accordance with some demonstrative aspects.

Reference is made to FIG. 5, which schematically illustrates a method of MU DL transmission, in accordance with some demonstrative aspects. For example, one or more of the operations of the method of FIG. 5 may be performed by a wireless communication system, e.g., system 100 (FIG. 1); a wireless communication device, e.g., device 102 (FIG. 1), device 140 (FIG. 1), and/or device 160 (FIG. 1); a controller, e.g., controller 124 (FIG. 1), and/or controller 154 (FIG. 1); a radio, e.g., radio 114 (FIG. 1), and/or radio 144 (FIG. 1); a message processor, e.g., message processor 128 (FIG. 1), and/or message processor 158 (FIG. 1); a transmitter, e.g., transmitter 118 (FIG. 1), and/or transmitter 148 (FIG. 1); and/or a receiver, e.g., receiver 116 (FIG. 1), and/or receiver 146 (FIG. 1).

As indicated at block 502, the method may include operating a non-AP STA in a PS-Poll-less PSM. For example, controller 154 (FIG. 1) may control, cause and/or trigger a non-AP STA implemented by device 140 (FIG. 1) to operate in the PS-Poll-less PSM, e.g., as described above.

As indicated at block 504, operating in the PS-Poll-less PSM may include processing a traffic indication in a beacon frame from an AP STA to determine whether traffic is pending for transmission from the AP STA to the non-AP STA in the PS-Poll-less PSM. For example, controller 154 (FIG. 1) may control, cause and/or trigger the non-AP STA implemented by device 140 (FIG. 1) to process the traffic indication in the beacon frame from device 102 (FIG. 1) to determine whether traffic is pending for transmission from device 102 (FIG. 1) to device 140 (FIG. 1) in the PS-Poll-less PSM, e.g., as described above.

As indicated at block 506, operating in the PS-Poll-less PSM may include, based on a determination that traffic is pending for transmission from the AP STA to the non-AP STA in the PS-Poll-less PSM, refraining from transmission of a PS Poll frame to the AP STA, and waiting to receive from the AP STA a PS-Poll-less MU DL transmission, which does not require prior receipt of PS Poll frames from a plurality of non-AP STAs in the PS-Poll-less PSM. For example, controller 154 (FIG. 1) may control, cause and/or trigger the non-AP STA implemented by device 140 (FIG. 1) to, based on the determination that traffic is pending for transmission from device 102 (FIG. 1) to device 140 (FIG. 1) in the PS-Poll-less PSM, refrain from transmission of the PS Poll frame to device 102 (FIG. 1), and wait to receive from device 102 (FIG. 1) the PS-Poll-less MU DL transmission, e.g., as described above.

Figure 6:
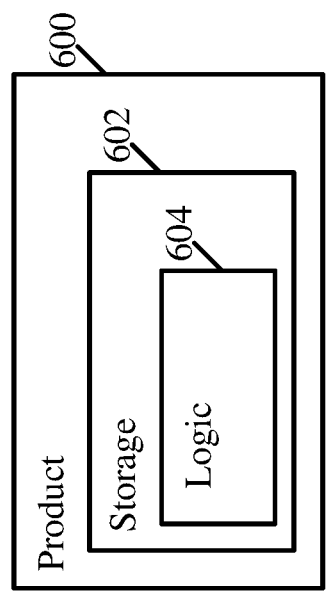
FIG. 6 is a schematic illustration of a product of manufacture, in accordance with some demonstrative aspects.

Reference is made to FIG. 6, which schematically illustrates a product of manufacture 600, in accordance with some demonstrative aspects. Product 600 may include one or more tangible computer-readable ("machine readable") non-transitory storage media 602, which may include computer-executable instructions, e.g., implemented by logic 604, operable to, when executed by at least one processor, e.g., computer processor, enable the at least one processor to implement one or more operations at devices 102, 140, 160, 170 and/or 180 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1); to cause devices 102, 140, 160, 170 and/or 180 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1) to perform one or more operations; and/or to perform, trigger and/or implement one or more operations, communications and/or functionalities described above with reference to FIGS. 1, 2, 3, 4, and/or 5, and/or one or more operations described herein. The phrases "non-transitory machine-readable media (medium)" and "computer-readable non-transitory storage media (medium)" are directed to include all computer-readable media, with the sole exception being a transitory propagating signal.

In some demonstrative aspects, product 600 and/or storage media 602 may include one or more types of computer-readable storage media capable of storing data, including volatile memory, non-volatile memory, removable or non-removable memory, erasable or non-erasable memory, writeable or re-writeable memory, and the like. For example, storage media 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus comprising a processor comprising logic and circuitry configured to cause an Access Point (AP) wireless communication station (STA) to identify a plurality of non-AP STAs in a Power Save (PS) poll-less (PS-Poll-less) Power Save Mode (PSM) to be addressed by a PS-Poll-less Multi-User (MU) Downlink (DL) transmission, which does not require prior receipt of PS Poll frames from the plurality of non-AP STAs in the PS-Poll-less PSM; transmit a beacon frame comprising a traffic indication to indicate that traffic is pending for transmission from the AP STA to the plurality of non-AP STAs in the PS-Poll-less PSM; and subsequent to the beacon frame, transmit the PS-Poll-less MU DL transmission to the plurality of non-AP STAs in the PS-Poll-less PSM; and a memory to store information processed by the processor.

Example 2 includes the subject matter of Example 1, and optionally, wherein the apparatus is configured to cause the AP STA to transmit to a non-AP STA of the plurality of non-AP STAs a PS-Poll-less PSM operation indication configured to indicate that the non-AP STA is to operate in the PS-Poll-less PSM.

Example 3 includes the subject matter of Example 2, and optionally, wherein the apparatus is configured to cause the AP STA to transmit the PS-Poll-less PSM operation indication to the non-AP STA based on a capability indication from the non-AP STA, the capability indication to indicate that the non-AP STA is capable of operating in the PS-Poll-less PSM.

Example 4 includes the subject matter of any one of Examples 1-3, and optionally, wherein the apparatus is configured to cause the AP STA to communicate with a non-AP STA of the plurality of non-AP STAs one or more negotiation messages to negotiate a configuration of the PS-Poll-less PSM.

Example 5 includes the subject matter of any one of Examples 1-4, and optionally, wherein the apparatus is configured to cause the AP STA to communicate with a non-AP STA of the plurality of non-AP STAs one or more negotiation messages to negotiate a time period between the beacon frame and the PS-Poll-less MU DL transmission.

Example 6 includes the subject matter of any one of Examples 1-5, and optionally, wherein the apparatus is configured to cause the AP STA to transmit the PS-Poll-less MU DL transmission separated from the beacon frame by a predefined time period.

Example 7 includes the subject matter of Example 6, and optionally, wherein the beacon frame includes an indication of the predefined time period.

Example 8 includes the subject matter of any one of Examples 1-7, and optionally, wherein the apparatus is configured to cause the AP STA to transmit the PS-Poll-less MU DL transmission a Short-Inter-Frame-Space (SIFS) period after the beacon frame.

Example 9 includes the subject matter of any one of Examples 1-8, and optionally, wherein the apparatus is configured to cause the AP STA to configure the traffic indication to indicate that traffic is pending for transmission from the AP STA to an other plurality of non-AP STAs, the other plurality of non-AP STAs comprising non-AP STAs, which are not in the PS-Poll-less PSM; and based on receipt of PS poll frames from the other plurality of non-AP STAs subsequent to the beacon frame, transmit a MU DL transmission to the other plurality of non-AP STAs.

Example 10 includes the subject matter of any one of Examples 1-9, and optionally, wherein the apparatus is configured to cause the AP STA to transmit the PS-Poll-less MU DL transmission separated from the beacon frame by a PS-poll-less time period, which does not include communication of any PS-poll frame from the plurality of non-AP STAs in the PS-Poll-less PSM to the AP STA.

Example 11 includes the subject matter of any one of Examples 1-10, and optionally, wherein the traffic indication comprises a traffic Indication Map (TIM) element comprising identifiers of the plurality of non-AP STAs in the PS-Poll-less PSM.

Example 12 includes the subject matter of any one of Examples 1-11, and optionally, wherein the PS-Poll-less MU DL transmission comprises a MU DL Orthogonal-Frequency-Division-Multiple-Access (OFDMA) transmission.

Example 13 includes the subject matter of any one of Examples 1-12, and optionally, comprising a radio to transmit the beacon frame and the PS-Poll-less MU DL transmission.

Example 14 includes the subject matter of Example 13, and optionally, comprising one or more antennas connected to the radio, and another processor to execute instructions of an operating system.

Example 15 includes an apparatus comprising a processor comprising logic and circuitry configured to cause a non-Access Point (AP) wireless communication station (STA) to operate in a Power Save (PS) poll-less (PS-Poll-less) Power Save Mode (PSM) to process a traffic indication in a beacon frame from an AP STA to determine whether traffic is pending for transmission from the AP STA to the non-AP STA in the PS-Poll-less PSM; and based on a determination that traffic is pending for transmission from the AP STA to the non-AP STA in the PS-Poll-less PSM, refrain from transmission of a PS Poll frame to the AP STA, and wait to receive from the AP STA a PS-Poll-less Multi-User (MU) Downlink (DL) transmission, which does not require prior receipt of PS Poll frames from a plurality of non-AP STAs in the PS-Poll-less PSM; and a memory to store information processed by the processor.

Example 16 includes the subject matter of Example 15, and optionally, wherein the apparatus is configured to cause the non-AP STA to operate in the PS-Poll-less PSM based on a PS-Poll-less PSM operation indication from the AP STA to indicate that the non-AP STA is to operate in the PS-Poll-less PSM.

Example 17 includes the subject matter of Example 15 or 16, and optionally, wherein the apparatus is configured to cause the non-AP STA to transmit to the AP STA a capability indication to indicate that the non-AP STA is capable of operating in the PS-Poll-less PSM.

Example 18 includes the subject matter of any one of Examples 15-17, and optionally, wherein the apparatus is configured to cause the non-AP STA to communicate with the AP STA one or more negotiation messages to negotiate a configuration of the PS-Poll-less PSM.

Example 19 includes the subject matter of any one of Examples 15-18, and optionally, wherein the apparatus is configured to cause the non-AP STA to communicate with the AP STA one or more negotiation messages to negotiate a time period between the beacon frame and the PS-Poll-less MU DL transmission.

Example 20 includes the subject matter of any one of Examples 15-19, and optionally, wherein the apparatus is configured to cause the non-AP STA to wait to receive the PS-Poll-less MU DL transmission separated from the beacon frame by a predefined time period.

Example 21 includes the subject matter of Example 20, and optionally, wherein the beacon frame includes an indication of the predefined time period.

Example 22 includes the subject matter of any one of Examples 15-21, and optionally, wherein the apparatus is configured to cause the non-AP STA to wait to receive the PS-Poll-less MU DL transmission a Short-Inter-Frame-Space (SIFS) period after the beacon frame.

Example 23 includes the subject matter of any one of Examples 15-22, and optionally, wherein the apparatus is configured to cause the non-AP STA to wait to receive the PS-Poll-less MU DL transmission separated from the beacon frame by a PS-poll-less time period, which does not include communication of any PS-poll frame from the non-AP STAs in the PS-Poll-less PSM to the AP STA.

Example 24 includes the subject matter of any one of Examples 15-22, and optionally, wherein the traffic indication comprises a traffic Indication Map (TIM) element comprising identifiers of the plurality of non-AP STAs in the PS-Poll-less PSM.

Example 25 includes the subject matter of any one of Examples 15-24, and optionally, comprising a radio to receive the beacon frame and the PS-Poll-less MU DL transmission.

Example 26 includes the subject matter of Example 25, and optionally, comprising one or more antennas connected to the radio, and another processor to execute instructions of an operating system.

Example 27 comprises an apparatus comprising means for executing any of the described operations of Examples 1-26.

Example 28 comprises a product comprising one or more tangible computer-readable non-transitory storage media comprising computer-executable instructions operable to, when executed by at least one processor, enable the at least one processor to cause a computing device to perform any of the described operations of Examples 1-26.

Example 29 comprises an apparatus comprising: a memory interface; and processing circuitry configured to: perform any of the described operations of Examples 1-26.

Example 30 comprises a method comprising any of the described operations of Examples 1-26.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a processor comprising logic and circuitry configured to cause an Access Point (AP) wireless communication station (STA) to:
identify a plurality of non-AP STAs in a Power Save (PS) poll-less (PS-Poll-less) Power Save Mode (PSM) to be addressed by a PS-Poll-less Multi-User (MU) Downlink (DL) transmission, which does not require prior transmission of PS Poll frames from the plurality of non-AP STAs in the PS-Poll-less PSM;
subsequent to identifying the plurality of non-AP STAs in the PS-Poll-less PSM, transmit a beacon frame comprising a traffic indication to indicate that traffic is pending for transmission from the AP STA to the plurality of non-AP STAs in the PS-Poll-less PSM; and
subsequent to the beacon frame, transmit the PS-Poll-less MU DL transmission to the plurality of non-AP STAs in the PS-Poll-less PSM without the AP STA waiting for any prior transmission of any PS Poll frames from the plurality of non-AP STAs in the PS-Poll-less PSM after the beacon frame, the PS-Poll-less MU DL transmission separated from the beacon frame by a PS-poll-less time period, which does not include transmission of any PS-poll frame from any of the plurality of non-AP STAs in the PS-Poll-less PSM to the AP STA; and
a memory to store information processed by the processor.

2. The apparatus of claim 1 configured to cause the AP STA to transmit to a non-AP STA of the plurality of non-AP STAs a PS-Poll-less PSM operation indication configured to indicate that the non-AP STA is to operate in the PS-Poll-less PSM.

3. The apparatus of claim 2 configured to cause the AP STA to transmit the PS-Poll-less PSM operation indication to the non-AP STA based on a capability indication from the non-AP STA, the capability indication to indicate that the non-AP STA is capable of operating in the PS-Poll-less PSM.

4. The apparatus of claim 1 configured to cause the AP STA to communicate with a non-AP STA of the plurality of non-AP STAs one or more negotiation messages to negotiate a configuration of the PS-Poll-less PSM.

5. The apparatus of claim 1 configured to cause the AP STA to communicate with a non-AP STA of the plurality of non-AP STAs one or more negotiation messages to negotiate a duration of the PS-poll-less time period.

6. The apparatus of claim 1, wherein the PS-poll-less time period is a predefined time period.

7. The apparatus of claim 6, wherein the beacon frame includes an indication of the predefined time period.

8. The apparatus of claim 1, wherein the PS-poll-less time period comprises a Short-Inter-Frame-Space (SIFS) period after the beacon frame.

9. The apparatus of claim 1 configured to cause the AP STA to:
configure the traffic indication to indicate that traffic is pending for transmission from the AP STA to an other plurality of non-AP STAs, the other plurality of non-AP STAs comprising non-AP STAs, which are not in the PS-Poll-less PSM; and
based on receipt of PS poll frames from the other plurality of non-AP STAs subsequent to the beacon frame, transmit a MU DL transmission to the other plurality of non-AP STAs.

10. The apparatus of claim 1, wherein the traffic indication comprises a traffic Indication Map (TIM) element comprising identifiers of the plurality of non-AP STAs in the PS-Poll-less PSM.

11. The apparatus of claim 1, wherein the PS-Poll-less MU DL transmission comprises a MU DL Orthogonal-Frequency-Division-Multiple-Access (OFDMA) transmission.

12. The apparatus of claim 1 comprising a radio to transmit the beacon frame and the PS-Poll-less MU DL transmission.

13. The apparatus of claim 12 comprising one or more antennas connected to the radio, and another processor to execute instructions of an operating system.

14. A product comprising one or more tangible computer-readable non-transitory storage media comprising instructions operable to, when executed by at least one processor, enable the at least one processor to cause an Access Point (AP) wireless communication station (STA) to:
identify a plurality of non-AP STAs in a Power Save (PS) poll-less (PS-Poll-less) Power Save Mode (PSM) to be addressed by a PS-Poll-less Multi-User (MU) Downlink (DL) transmission, which does not require prior transmission of PS Poll frames from the plurality of non-AP STAs in the PS-Poll-less PSM;
subsequent to identifying the plurality of non-AP STAs in the PS-Poll-less PSM, transmit a beacon frame comprising a traffic indication to indicate that traffic is pending for transmission from the AP STA to the plurality of non-AP STAs in the PS-Poll-less PSM; and
subsequent to the beacon frame, transmit the PS-Poll-less MU DL transmission to the plurality of non-AP STAs in the PS-Poll-less PSM by transmitting the PS-Poll-less MU DL transmission separated from the beacon frame by a PS-poll-less time period, which does not include transmission of any PS-poll frame from any of the plurality of non-AP STAs in the PS-Poll-less PSM to the AP STA, and without the AP STA waiting for any prior transmission of any PS Poll frames from the plurality of non-AP STAs in the PS-Poll-less PSM during the PS-poll-less time period.

15. The product of claim 14, wherein the instructions, when executed, cause the AP STA to transmit to a non-AP STA of the plurality of non-AP STAs a PS-Poll-less PSM operation indication configured to indicate that the non-AP STA is to operate in the PS-Poll-less PSM.

16. The product of claim 15, wherein the instructions, when executed, cause the AP STA to transmit the PS-Poll-less PSM operation indication to the non-AP STA based on a capability indication from the non-AP STA, the capability indication to indicate that the non-AP STA is capable of operating in the PS-Poll-less PSM.

17. The product of claim 14, wherein the instructions, when executed, cause the AP STA to communicate with a non-AP STA of the plurality of non-AP STAs one or more negotiation messages to negotiate a configuration of the PS-Poll-less PSM.

18. The product of claim 14, wherein the instructions, when executed, cause the AP STA to communicate with a non-AP STA of the plurality of non-AP STAs one or more negotiation messages to negotiate a duration of the PS-poll-less time period.

19. The product of claim 14, wherein the PS-poll-less time period is a predefined time period.

20. The product of claim 14, wherein the PS-poll-less time period is a Short-Inter-Frame-Space (SIFS) period after the beacon frame.

21. The product of claim 14, wherein the instructions, when executed, cause the AP STA to:
configure the traffic indication to indicate that traffic is pending for transmission from the AP STA to an other plurality of non-AP STAs, the other plurality of non-AP STAs comprising non-AP STAs, which are not in the PS-Poll-less PSM; and
based on receipt of PS poll frames from the other plurality of non-AP STAs subsequent to the beacon frame, transmit a MU DL transmission to the other plurality of non-AP STAs.

22. The product of claim 14, wherein the traffic indication comprises a traffic Indication Map (TIM) element comprising identifiers of the plurality of non-AP STAs in the PS-Poll-less PSM.

23. An apparatus comprising:
means for identifying at an Access Point (AP) wireless communication station (STA) a plurality of non-AP STAs in a Power Save (PS) poll-less (PS-Poll-less) Power Save Mode (PSM) to be addressed by a PS-Poll-less Multi-User (MU) Downlink (DL) transmission, which does not require prior transmission of PS Poll frames from the plurality of non-AP STAs in the PS-Poll-less PSM;
means for causing the AP STA to transmit a beacon frame subsequent to identifying the plurality of non-AP STAs in the PS-Poll-less PSM, the beacon frame comprising a traffic indication to indicate that traffic is pending for transmission from the AP STA to the plurality of non-AP STAs in the PS-Poll-less PSM; and
means for causing the AP STA to, subsequent to the beacon frame, transmit the PS-Poll-less MU DL transmission to the plurality of non-AP STAs in the PS-Poll-less PSM without the AP STA waiting for any prior transmission of any PS Poll frames from the plurality of non-AP STAs in the PS-Poll-less PSM after the beacon frame, the PS-Poll-less MU DL transmission separated from the beacon frame by a PS-poll-less time period, which does not include transmission of any PS-poll frame from any of the plurality of non-AP STAs in the PS-Poll-less PSM to the AP STA.

24. The apparatus of claim 23 comprising means for causing the AP STA to transmit to a non-AP STA of the plurality of non-AP STAs a PS-Poll-less PSM operation indication configured to indicate that the non-AP STA is to operate in the PS-Poll-less PSM.

* * * * *